US011155008B2

(12) United States Patent
Dhaussy et al.

(10) Patent No.: US 11,155,008 B2
(45) Date of Patent: Oct. 26, 2021

(54) METHOD FOR THE PRODUCTION OF A PLASTIC TANK COMPRISING AN ANTI-SLOSH DEVICE

(71) Applicant: Plastic Omnium Advanced Innovation and Research, Brussels (BE)

(72) Inventors: Franck Dhaussy, Margny-les-Compiegne (FR); Wilfried Lemasson, Marest sur Matz (FR); Frederic Guignery, Mery-sur-Oise (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 982 days.

(21) Appl. No.: 15/554,484

(22) PCT Filed: Apr. 1, 2016

(86) PCT No.: PCT/EP2016/057288
§ 371 (c)(1),
(2) Date: Aug. 30, 2017

(87) PCT Pub. No.: WO2016/156608
PCT Pub. Date: Oct. 6, 2016

(65) Prior Publication Data
US 2018/0071963 A1 Mar. 15, 2018

(30) Foreign Application Priority Data
Apr. 3, 2015 (FR) ........................................ 1552916
Nov. 6, 2015 (FR) ........................................ 1560675

(51) Int. Cl.
*B29C 44/12* (2006.01)
*B29C 49/04* (2006.01)
(Continued)

(52) U.S. Cl.
CPC ........ *B29C 44/1271* (2013.01); *B29C 44/065* (2013.01); *B29C 44/08* (2013.01);
(Continued)

(58) Field of Classification Search
None
See application file for complete search history.

(56) References Cited

U.S. PATENT DOCUMENTS

2001/0015513 A1    8/2001   Schaftingen et al.
2009/0121375 A1    5/2009   Okamoto et al.
(Continued)

FOREIGN PATENT DOCUMENTS

CA          2 925 271 A1    4/2015
DE   10 2011 113 845 A1    3/2013
(Continued)

OTHER PUBLICATIONS

International Search Report dated Sep. 21, 2016 in PCT/EP2016/057288 filed Apr. 1, 2016.

*Primary Examiner* — Monica A Huson
(74) *Attorney, Agent, or Firm* — Oblon, McClelland, Maier & Neustadt, L.L.P.

(57) ABSTRACT

A process is disclosed for manufacturing at least one wall of a tank and comprises at least a first layer of thermoplastic and a second foam-based layer. The second foam-based layer forms at least part of an anti-slosh device, and the process is characterized in that the first layer and the second layer are molded in the same mold.

12 Claims, 3 Drawing Sheets

(51) Int. Cl.
    *B29C 49/22*      (2006.01)
    *B60K 15/077*     (2006.01)
    *B60K 15/03*      (2006.01)
    *B29C 45/16*      (2006.01)
    *B32B 5/00*       (2006.01)
    *B32B 27/00*      (2006.01)
    *B32B 1/02*       (2006.01)
    *B29C 44/06*      (2006.01)
    *B32B 1/00*       (2006.01)
    *B29C 44/34*      (2006.01)
    *B29C 44/08*      (2006.01)
    *B29D 22/00*      (2006.01)
    *B32B 5/18*       (2006.01)
    *B29C 49/00*      (2006.01)
    *B29L 31/00*      (2006.01)
    *B29K 75/00*      (2006.01)
    *B29L 31/16*      (2006.01)
    *B29K 101/12*     (2006.01)
    *B29K 105/04*     (2006.01)

(52) U.S. Cl.
    CPC .......... *B29C 44/3484* (2013.01); *B29C 45/16* (2013.01); *B29C 45/1635* (2013.01); *B29C 49/0047* (2013.01); *B29C 49/04* (2013.01); *B29C 49/22* (2013.01); *B29D 22/00* (2013.01); *B32B 1/00* (2013.01); *B32B 1/02* (2013.01); *B32B 5/00* (2013.01); *B32B 5/18* (2013.01); *B32B 27/00* (2013.01); *B60K 15/03* (2013.01); *B60K 15/03177* (2013.01); *B60K 15/077* (2013.01); *B29C 2049/0057* (2013.01); *B29K 2075/00* (2013.01); *B29K 2101/12* (2013.01); *B29K 2105/04* (2013.01); *B29K 2995/0072* (2013.01); *B29L 2031/16* (2013.01); *B29L 2031/7172* (2013.01); *B32B 2597/00* (2013.01); *B60K 2015/03032* (2013.01); *B60K 2015/03046* (2013.01); *B60K 2015/0775* (2013.01); *B60K 2015/0777* (2013.01)

(56) References Cited

U.S. PATENT DOCUMENTS

| | | |
|---|---|---|
| 2010/0187710 A1 | 7/2010 | Tanaka et al. |
| 2014/0326732 A1 | 11/2014 | Hutzen et al. |
| 2015/0061192 A1 | 3/2015 | Sun |
| 2015/0061193 A1 | 3/2015 | Sun et al. |
| 2015/0061194 A1 | 3/2015 | Sun et al. |
| 2016/0214479 A1 | 7/2016 | Tanaka et al. |

FOREIGN PATENT DOCUMENTS

| | | | |
|---|---|---|---|
| EP | 1 110 697 A2 | | 6/2001 |
| EP | 2 322 337 A1 | | 5/2011 |
| FR | 2 216 079 A1 | | 8/1974 |
| GB | 1 465 736 | | 3/1977 |
| GB | 1465736 A | * | 3/1977 |
| JP | 6-285964 A | | 10/1994 |
| WO | 2008/138869 A1 | | 11/2008 |
| WO | 2010/029103 A1 | | 3/2010 |
| WO | 2015/046307 A1 | | 4/2015 |

* cited by examiner

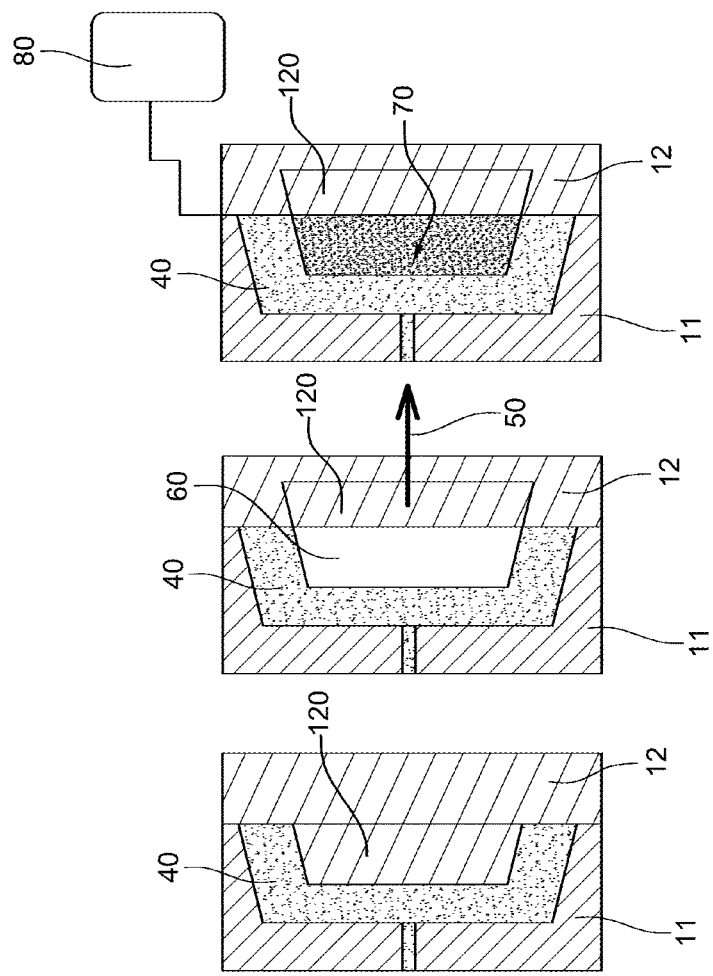

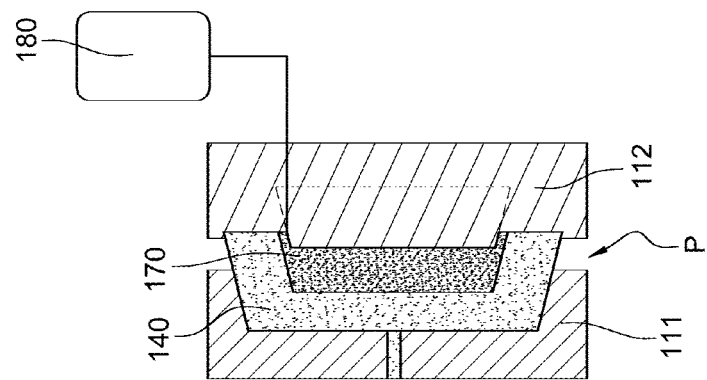
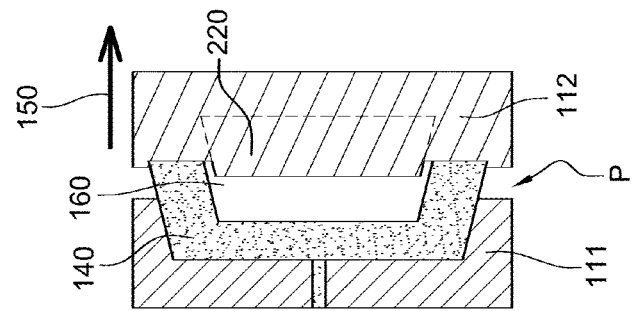
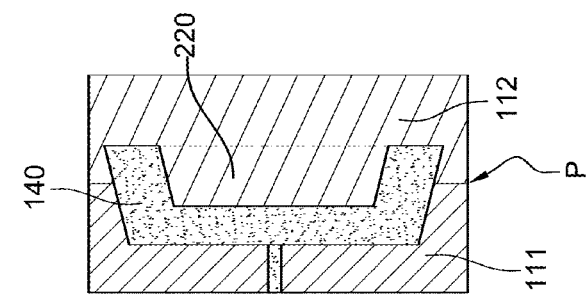
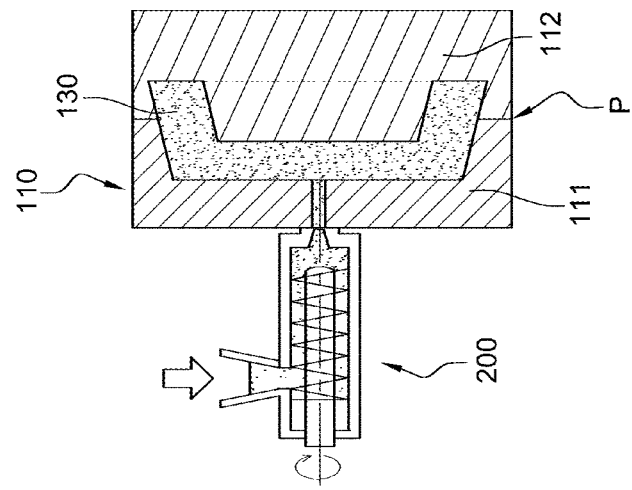

METHOD FOR THE PRODUCTION OF A PLASTIC TANK COMPRISING AN ANTI-SLOSH DEVICE

BACKGROUND OF THE INVENTION

Field of the Invention

The present invention relates to a process for manufacturing a plastic tank. More precisely, the invention relates to the manufacture of a tank equipped with an anti-slosh device. The invention applies especially to the manufacture of tanks for storing a liquid for mobile vehicles, for instance fuel or urea.

Description of the Related Art

In the case of a vehicle tank, successive braking and restarting maneuvers of the vehicle cause movements of the mass of liquid in the tank, which are perceived by the driver as slosh noise. In addition, these mass movements may have an impact on the driving behavior of the vehicle.

To overcome these drawbacks, tanks equipped with anti-slosh devices (or baffles) comprising rigid or semirigid partitions have been proposed.

Several techniques are known for manufacturing such tanks.

A first known technique consists in fixing an anti-slosh device into a tank after the tank has been molded. This first known technique is described, for example, in WO 2010/029103.

A second known technique consists in fixing an anti-slosh device into a tank during the molding of the tank. This second known technique is described, for example, in WO 2008/138869.

These fixing operations are intricate and time-consuming. Moreover, the vibrations induced by the impact of the liquid on these rigid or semirigid anti-slosh devices may give rise to structure-borne noise in the tank.

BRIEF SUMMARY OF THE INVENTION

One of the aims of the invention is thus to propose an alternative to the current techniques for manufacturing tanks equipped with anti-slosh devices.

The term "tank" is understood to denote a leaktight chamber for storing fuel, a fuel additive (such as those required for reducing the combustion temperature of particles retained on the particle filters of diesel engines, for example), for exhaust gases (such as urea or other ammonia precursors in SCR systems) or any other fluid carried on board a vehicle (car, truck, etc.).

Consequently, a process is proposed for manufacturing at least one wall of a tank comprising at least a first layer of thermoplastic and a second foam-based layer, said second foam-based layer forming at least part of an anti-slosh device, the process being characterized in that the first layer and the second layer are molded in the same mold.

Thus, the tank manufactured according to the process of the invention may be equipped with an anti-slosh device based on thermosetting or thermoplastic foam (with open or closed cells). Such an anti-slosh device is obtained (i.e. formed) during the blow-molding or injection-molding of the preform. By means of the invention, a tank equipped with an anti-slosh device may thus be manufactured by means of a blow-molding or injection-molding operation.

The invention thus affords the advantage of saving in means and labor, and significantly increases the efficiency of the anti-slosh device.

In a first particular embodiment of the invention, a process is proposed for the manufacture by extrusion blow-molding of a tank equipped with an anti-slosh device.

The process according to the first particular embodiment of the invention comprises the following steps:
  a thermoplastic preform comprising at least the first layer and the second layer is inserted into said same open mold;
  said same mold is closed; and
  once said same mold is closed, the preform is blow-molded by means of a fluid under pressure to press it against said same mold.

The term "preform" means a tubular parison or a set of two sheets of thermoplastic. The tubular parison or the set of two sheets may themselves be formed from several layers of different materials (obtained, for example, by coextrusion).

Advantageously, to obtain the thermoplastic preform comprising at least the first layer and the second layer, the first layer and the second layer are simultaneously extruded.

Advantageously, the second layer is a layer formed from a blend of a thermoplastic polymer and of a chemical foaming agent. This second layer, or blend layer, forms the anti-slosh device after blow-molding.

The term "polymer" denotes both homopolymers and copolymers (especially binary or ternary). Examples of such copolymers are, in a nonlimiting manner randomly distributed copolymers, sequenced copolymers, block copolymers and grafted copolymers. In particular, use may be made of polyolefins, thermoplastic polyesters, polyketones, polyamides and PU copolymers thereof. A blend of polymers or copolymers may also be used, as may a blend of polymer materials with inorganic, organic and/or natural fillers, for instance, but in a nonlimiting manner carbon, salts and other inorganic derivatives, natural or polymeric fibers. Excellent results may be obtained with high-density polyethylene (HDPE) or polyamide-6,6.

In a particular embodiment, the preform comprises an inner layer (i.e. said second layer) comprising said blend layer, one or more layers comprising at least one adhesive, and an outer layer (i.e. said first layer) based on thermoplastic polymer.

In another particular embodiment, the preform comprises an inner layer comprising said blend layer and an outer layer based on thermoplastic polymer. In this particular case, no adhesive layer is used.

Advantageously, once said same mold is closed, a gas containing a reagent, for example based on nitrogen or carbon dioxide ($CO_2$), is injected into the closed mold, so as to initiate a foaming reaction of the foaming agent of the second layer. As in a conventional extrusion blow-molding process, the gas under pressure presses the parison against the walls of the mold.

Preferably, this introduction of the reagent into the mold is performed by introducing the gas comprising the reagent during the blow-molding phase. The foaming reaction is then engaged during the phase of blow-molding of the tank, once the tank mold has been reclosed on the parison.

In the case of parisons made from two sheets, this being a known technique described, for example, in EP 1 110 697, it is possible to control the expansion of the foam by using counterforms mounted on a core of the blow-molding mold. The term "counterforms" means herein mobile or immobile parts of the mold for mechanically controlling the expansion of the foam by blocking it, if necessary.

Advantageously, the preform also comprises an intermediate layer comprising at least one adhesive.

Advantageously, the preform also comprises a barrier layer against hydrocarbons and/or a layer comprising recycled plastic, which is (are) located between the inner layer (i.e. said second layer) and the outer layer (i.e. said first layer).

Thus, the process of the invention is suitable for manufacturing tanks made of multilayer plastic.

The term "barrier layer" is intended to denote a liquid-impermeable and gas-impermeable layer. The barrier layer generally comprises a barrier resin. Any known barrier resin may be used, provided that it is effective with respect to the fluids in contact with the tank, in particular hydrocarbons, and that it is compatible with the molding technique that is used for forming this tank. Among the resins that may be used, mention may be made, in a nonlimiting manner, of polyamides or copolyamides or statistical copolymers of ethylene and of vinyl alcohol. A blend of different barrier resins may also be used. Very good results have been obtained with a barrier resin of statistical copolymer of ethylene and of vinyl alcohol.

The term "recycled plastic" means a plastic obtained by grinding scraps obtained in different steps of the manufacture of a tank, in particular the multilayer tank according to the invention, or by grinding used tanks at the end of their service life.

The chemical foaming agent that may be used is preferably azodicarbonamide, an isobutane/n-butane mixture, a chlorofluorocarbon or any other foaming agent that has the same properties.

In a second particular embodiment of the invention, a process is proposed for the manufacture by injection-molding of a tank equipped with an anti-slosh device.

The process according to the second particular embodiment of the invention comprises the following steps:
said same mold is placed in a first closing position so as to form a first injection-molding cavity;
said first layer is injection-molded;
said same mold is placed in a second closing position so as to form a second injection-molding cavity;
said second layer is injection-molded.

Thus, with this second embodiment, it is possible to control the dimensions of the second layer, and thus of the anti-slosh device. More precisely, the dimensions of the second layer may be controlled by adjusting the opening of the second injection-molding cavity. Thus, with the same mold, it is possible to manufacture tanks comprising anti-slosh devices of different shapes and sizes.

Preferably, a gas, for example nitrogen, is injected into said same closed mold, so as to trigger a foam expansion reaction. This also makes it possible to optimize the size of the porosities of the foam.

Advantageously, said first injection-molded layer comprises at least one attachment cavity into which said second layer can penetrate during its injection into the second injection-molding cavity.

Advantageously, said same mold comprises several points for injecting said second layer.

Advantageously, said second layer is a layer of polyurethane foam.

Advantageously, said second layer is a layer of polymer foam.

BRIEF DESCRIPTION OF THE SEVERAL VIEWS OF THE DRAWINGS

FIGS. 2a to 2d serve to illustrate, as an indicative and nonlimiting example, the principle of an injection-molding manufacturing process according to the second particular embodiment of the invention.

FIGS. 3a to 3d serve to illustrate, as an indicative and nonlimiting example, the principle of a second injection-molding manufacturing process according to the second particular embodiment of the invention.

DETAILED DESCRIPTION OF THE INVENTION

Figure 1A:
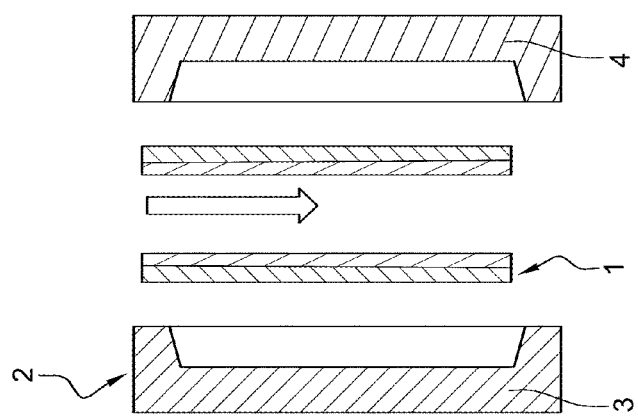
FIGS. 1a to 1c serve to illustrate, as an indicative and nonlimiting example, the principle of an extrusion blow-molding manufacturing process according to the first particular embodiment of the invention.

According to a first embodiment of the invention, and as illustrated in FIG. 1a, a plastic parison (1) is introduced between two mold cavities of a mold (2) in the open position. The parison (1) is introduced into the mold (2) while being held open/separated. The mold (2) comprises mold cavities (3, 4). The mold cavities (3, 4) of the mold have an inner surface (3', 4') corresponding to the outer surface of the tank to be molded.

In this exemplary embodiment, the parison (1) comprises a multilayer structure. It thus comprises an inner layer, which is itself composed of a first layer of HDPE (high-density polyethylene) and a second layer of a chemical foaming agent, an intermediate layer comprising an adhesive, and an HDPE-based outer layer. It will be noted that the intermediate adhesive layer is optional.

The inner layer of the parison is in a viscous state at the temperatures for forming the parison (1), and its viscosity, at the time of its introduction into the mold, is similar to that of the high-density polyethylene used in a standard tank-forming process.

Moreover, at the time of its introduction into the mold (2), i.e. before the blow-molding operation, the second layer of foaming agent, which is reactive but not yet foamed, is integrally attached to the HDPE first layer. To this end, the layer of foaming agent is preferably produced simultaneously therewith by extrusion.

Figure 1B:
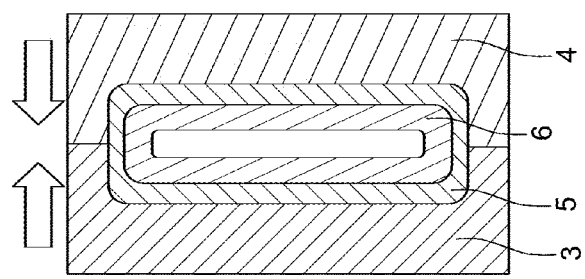
Figure 1C:
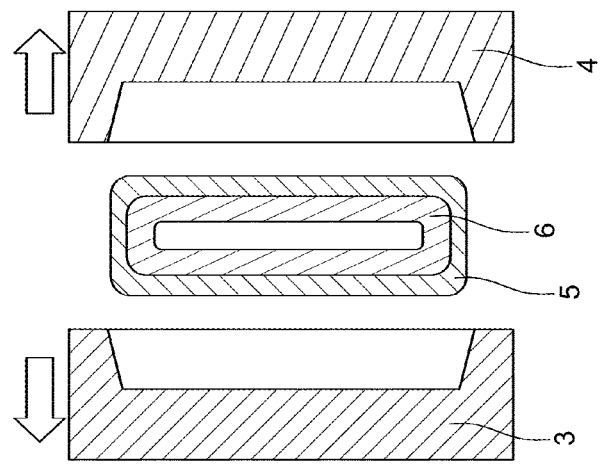

A reagent for engaging a foaming reaction (or activation of the foaming agent) is, in the first embodiment illustrated in FIGS. 1a to 1c, introduced during the phase of blow-molding of the tank, once the tank mold has been reclosed on the parison (1). Preferably, this introduction of the reagent into the mold (2) is performed by introducing a specific gas, comprising the reagent, during the blow-molding phase.

Advantageously, the concentration of foaming agent, and also the thickness of the inner layer, must make it possible to produce, after the foaming reaction, a layer constituted mainly of open cells. The thickness of this said layer in the final state is advantageously between 5 mm and 200 mm.

FIG. 1b illustrates the step of blow-molding of the parison. During this step, the mold is completely closed. It may be seen that the mold cavities of the mold are adjoined via their periphery. During this blow-molding step, the outer wall (5) of the tank and a foam-based inner anti-slosh device (6) will be formed.

Specifically, during the blow-molding step, the gas containing the reagent for triggering the foaming reaction in the mold (2) is introduced, so as to totally or partially replace the air or the dinitrogen usually used in the blow-molding process. Expansion of the foam is controlled by varying the temperature, the pressure, the concentration of reagent in the blow-molding gas, and the times of exposure of the inner layer of the tank with the reagent. Preferably, the gas comprising the reagent is nitrogen and the reagent is based on nitrogen or carbon dioxide ($CO_2$).

In the case of a tank made from a parison, the joint plane of the tank is exposed to the reagent only during the pre-inflation phase. This pre-inflation phase may proceed using a blow-molding gas not containing any reagent, the reagent being introduced after the end of the pre-inflation phase.

In the context of a tank made from two sheets, the joint plane is not exposed to the reagent.

Moreover, still in the context of a tank made from two sheets, the expansion of the foam may be mechanically constrained by elements supported by the core of the mold (2), such as counterforms mounted on a core of the blow-molding mold. These counterforms are mobile or immobile parts of the mold (2) for mechanically controlling the expansion of the foam by blocking it, if necessary.

It will be noted that the phase of activation of the foaming agent has very little impact on the blow-molding time of conventional tanks. Nevertheless, it may be necessary to purge the gas containing the reagent before terminating the blow-molding process.

When the assembly is cooled, the mold is opened (i.e. the mold cavities are separated from each other) and the tank may be stripped from the mold. This is illustrated in FIG. 1c. A tank having, in its slosh zones, an open-cell foam coating, the presence of which makes it possible to limit the structure-borne noise or slosh noise in the tank, is thus obtained. The tank thus manufactured thus advantageously comprises an anti-slosh device fixed onto its inner periphery.

According to a second embodiment of the invention, the tank is manufactured by injection-molding.

A mold (10) may be seen in a first closing position in FIG. 2a. The mold is connected to an injection screw (20). In this first closing position, a first injection-molding cavity (30) is formed between the mold cavities (11, 12) of the mold.

Next, as may be seen in FIG. 2b, the injection screw (20) injects a thermoplastic polymer into the first injection-molding cavity, so as to mold a first wall element (i.e. said first injection-molded layer) (40).

Advantageously, the mold cavity (12) of the mold comprises a mobile part (120) configured so as to move relative to the mold cavity (12).

The mold (10) may be seen in a second closing position in FIG. 2c. As illustrated, the mold passes from the first closing position to the second closing position by moving the mobile part (120) in a direction indicated by the arrow (50). In this second closing position, a second injection-molding cavity (60) is formed between the mold cavities of the mold.

As illustrated in FIG. 2d, the mold (10) is connected to an injection nozzle (80) configured to inject a polymer foam into the second injection-molding cavity (60). The polymer foam may be, for example and in a nonlimiting manner, a polyurethane foam.

This polyurethane foam is preferably derived from a blend of several liquid components. These components are, for example, blended under temperature and pressure conditions chosen so as to form a liquid that is injectable by means of a high-pressure blending machine, which is known per se, of which the injection nozzle (80) forms part.

Preferably, a gas, such as nitrogen, is added to the blend to engage a foam expansion reaction. Thus, a liquid foam supplemented with such a gas is preferably injected directly into the second injection-molding cavity (60). This also makes it possible to optimize the size of the porosities of the foam. It will be noted that the expansion reaction is due both to the blending of the products and to the conditions for injecting the blend and the gas.

By this means, a second wall element (i.e. the second injection-molded layer) (70) is molded onto the first wall element (40).

Advantageously, the second wall element (70) may form all or part of an anti-slosh device that is inside the tank.

FIGS. 3a to 3d serve to illustrate, as an indicative and nonlimiting example, the principle of a second injection-molding manufacturing process according to the second particular embodiment of the invention.

FIGS. 3a and 3b represent steps similar to those illustrated in FIGS. 2a and 2b, in which may be seen a mold (110) in a first closing position, the joint plane P joining the mold cavities (111, 112) of the mold of the mold being closed.

The mold may be seen in a second closing position in FIG. 3c, the joint plane P being open. As illustrated, the mold passes from the first closing position to the second closing position by moving, for example, the mold cavity (112) in a direction indicated by the arrow (150), the mold cavity (111), or alternatively by moving the two mold cavities of the mold (110). In this second closing position, a second injection-molding cavity (160) is formed between the mold cavities of the mold. Advantageously, the mold cavity (112) may be comprise a mobile part (220) configured to move relative to the mold cavity (112) and thus better control the size of the second injection-molding cavity (160).

As illustrated in FIG. 3d, the mold is connected to an injection nozzle (180) configured to inject a polymer foam into the second injection-molding cavity (160). The polymer foam may be, for example and in a nonlimiting manner, a polyurethane foam.

This polyurethane foam is preferably derived from a blend of several liquid components. These components are, for example, blended under temperature and pressure conditions chosen so as to form a liquid that is injectable by means of a high-pressure blending machine, which is known per se, from which is derived the injection nozzle (180).

Preferably, a gas, such as nitrogen, is added to the blend to engage a foam expansion reaction. Thus, a liquid foam supplemented with such a gas is preferably injected directly into the second injection-molding cavity (60). This also makes it possible to optimize the size of the porosities of the foam. It will be noted that the expansion reaction is due both to the blending of the products and to the conditions for injecting the blend and the gas.

By this means, a second wall element (i.e. said second injection-molded layer) (70) is molded onto the first wall element (140).

This step of injection-molding of the foam is performed with a joint plane P of the open mold which allows easy control of the expansion of the injected mold due to the depressurization created within the mold by opening the joint plane P. This opening also makes it possible to obtain an easier injection path for the injection nozzle (180).

After injecting the foam, it catalyzes and optimizes its expansion by means of the addition of gas and brings about an exothermic reaction. The free space of the cavity of the tool will thus be gradually completely filled with the foam. This expansion will be able to be controlled by the system for regulating the injection-molding tool. To this end, the injection-molding cycle time will be adapted to obtain a flexible foam.

After expansion, the mold is opened at high speed so as to create a decompression allowing perforation of the thin walls of the closed foam. Thus, at the end of the manufacturing cycle, a tank half-shell is obtained, having, in its slosh zones, an open-cell foam coating, the presence of which makes it possible to limit the structure-borne noise or slosh noise in the tank. Thus, advantageously, the second wall element (170) may form all or part of an anti-slosh device that is inside the tank.

In an advantageous embodiment, the first wall element (formed by the first injection-molded layer) may comprise one or more attachment cavities into which the polymer foam may penetrate during its injection into the second injection-molding cavity. In this way, solid mechanical fixing is obtained between the first and second wall elements. The attachment cavities form, for example, a network of ribs on the portion of the first wall element (140) which is facing the second wall element (70), or a back-draft.

In an alternative, the mold may comprise several foam injection points and also several thicknesses depending on the need.

The invention is not limited to the embodiments presented, and other embodiments will emerge clearly to a person skilled in the art. In particular, in another particular embodiment of the injection-molding process described with reference to FIGS. 2 and 3 above, the injection nozzle is adapted to inject any type of polymer foam. In a particular embodiment, the injection nozzle is capable of injecting at least two distinct types of polymer foams at different moments in the process.

The invention claimed is:

1. A process for manufacturing at least one wall of a tank comprising at least a first layer of thermoplastic and a second foam-based layer, said second foam-based layer forming at least part of an anti-slosh device, the first layer and the second layer being molded in the same mold, comprising:
   a thermoplastic preform comprising at least the first layer and the second layer is inserted into said same open mold;
   said same mold is closed; and
   once said same mold is closed, the preform is blow-molded by means of a fluid under pressure to press the preform against said same mold,
   wherein said second layer is a layer formed from a blend of a thermoplastic polymer and of a chemical foaming agent, and in that, once said same mold is closed, a gas or a liquid containing a reagent is injected into the closed mold, so as to trigger a foaming reaction of the foaming agent of the second layer.

2. The process according to claim 1, wherein, to obtain the thermoplastic preform comprising at least the first layer and the second layer, the first layer and the second layer are simultaneously extruded.

3. The process according to claim 1, wherein the preform further comprises an intermediate layer comprising at least one adhesive.

4. The process according to claim 1, wherein the preform further comprises at least one of a barrier layer against hydrocarbons or a layer comprising recycled plastic, being located between said first layer and said second layer.

5. The process according to claim 1, wherein the chemical foaming agent is azodicarbonamide.

6. A process for manufacturing at least one wall of a tank comprising at least a first layer of thermoplastic and a second foam-based layer, said second foam-based layer forming at least part of an anti-slosh device, the first layer and the second layer being molded in the same mold, comprising:
   said same mold is placed in a first closing position so as to form a first injection-molding cavity;
   said first layer is injection-molded;
   said same mold is placed in a second closing position so as to form a second injection-molding cavity;
   said second layer is injection-molded; and
   a gas is injected into said same closed mold, so as to trigger a foam expansion reaction.

7. The process according to claim 6, wherein said first injection-molded layer comprises at least one attachment cavity into which said second layer can penetrate during its injection into the second injection-molding cavity.

8. The process according to claim 6, wherein said same mold comprises several points for injecting said second layer.

9. The process according to claim 6, wherein said second layer is a layer of polyurethane foam.

10. The process according to claim 6, wherein said second layer is a layer of polymer foam.

11. The process according to claim 1, wherein the reagent injected is based on nitrogen or carbon dioxide.

12. The process according to claim 6, wherein the gas injected is nitrogen.

* * * * *